United States Patent [19]

Padoy et al.

[11] Patent Number: 5,507,965
[45] Date of Patent: Apr. 16, 1996

[54] PROTONIC, CONDUCTIVE, ELECTROLYTIC MATERIALS

[75] Inventors: Christian Padoy, Gonesse; Didier Le Couviour, La Courneuve, both of France

[73] Assignee: Saint-Gobain Vitrage, Courbevoie, France

[21] Appl. No.: 393,364

[22] Filed: Feb. 23, 1995

[30] Foreign Application Priority Data

Feb. 23, 1994 [FR] France .................................. 94 02048

[51] Int. Cl.$^6$ ........................... H01G 9/15; H01M 6/18; G02F 1/153
[52] U.S. Cl. .................. 252/62.2; 429/192; 429/193; 429/203; 359/265; 359/270; 252/517; 252/500; 252/521; 252/301.18; 252/301.35; 252/301.36
[58] Field of Search ............................... 252/62.2, 501.1, 252/517, 301.18, 301.35, 301.36, 500, 521; 429/192, 203, 193; 359/270, 265

[56] References Cited

U.S. PATENT DOCUMENTS

| | | | |
|---|---|---|---|
| 4,844,591 | 7/1989 | Arribart et al. | 359/270 |
| 5,429,759 | 7/1995 | Andrieu et al. | 252/62.2 |

FOREIGN PATENT DOCUMENTS 253713  1/1988  European Pat. Off. .

*Primary Examiner*—Stephen Kalafut
*Assistant Examiner*—Alan D. Diamond
*Attorney, Agent, or Firm*—Oblon, Spivak, McClelland, Maier, & Neustadt

[57] ABSTRACT

Protonic, conductive, macromolecular materials comprising a solid complex of anhydrous orthophosphoric acid and polyoxyethylene and also having an antioxidizing agent and/or a thixotropic agent are useful as an electrolyte in electrochromic systems, particularly systems fitted in the vertical position.

29 Claims, 6 Drawing Sheets

FIG_7

FIG_8

FIG_11

FIG_12

PROTONIC, CONDUCTIVE, ELECTROLYTIC MATERIALS

BACKGROUND OF THE INVENTION

1. Field of the Invention:

The present invention relates to novel protonic, conductive, electrolytic materials. It more particularly relates to the production of electrochromic systems mainly operating in light transmission, such as glazings for buildings or cars.

2. Discussion of the Background:

EP-A-253 713 discloses an electrochromic system operating by the insertion/deinsertion of protons in a layer of an oxide of a transition metal such as tungsten trioxide in contact with a solid electrolyte such as a protonic, conductive, electrolytic, macromolecular material formed by a phosphoric acid-polyoxyethylene ($H_3PO_4$-POE) complex. This material must be prepared under anhydrous conditions, taking particular care with the choice of solvents, in order to avoid a rapid deterioration of the other layers of the system associated with the electrolyte and in particular electrochromic material layers or electronically conductive layers or electrodes, between which is applied the potential difference necessary for coloration or decolorization.

Moreover, in order to prevent bubbling, which, after a few hours of operation totally degrades the optical quality of the system, EP-A-477 065 recommends a thorough degassing of the electrolyte, in vacuo and preferably at a high temperature, not only to avoid the trapping of air during the assembly of the glazing, but also so as to evacuate the air, or any solvent traces, trapped in the first polymer preparation phases.

This treatment is particularly effective in that it eliminates the bubbles which normally appear after a few dozen hours of operation. It also reduces the haze phenomenon, or in other words the proportion of the light diffused through the glazing, which when it becomes excessive no longer permits correct vision through the glazing. However, the degassing or more specifically the heating operation performed during the degassing (typically 3 hours at a temperature of 100°/120° C.) does not permit the elimination and even increases the yellowing of the polymer and the purity in the yellow, the latter essentially representing the perception of the color by the eye. This coloration of the glazing, in the decolorized state, is undesirable and in any case yellow is not very highly esteemed for building glazings.

In addition, this hot degassing treatment acts in precisely the same way as a thermal test and causes the deterioration of the polymer as when exposed to high temperatures. In this regard, it should be noted that an electrochromic system used as an external glazing can reach or exceed temperatures of about 80° C. under the combined effects of solar radiation and the black body effect when the glazing is in the colored state. Independently of any hot degassing treatment, there is consequently a problem of aging by yellowing of the polymer at temperatures of this level.

Analysis of the problem reveals that this yellowing is probably due to the formation of free radicals, which is aided by an acid medium. Although it is known to delay the formation of free radicals and/or block the action of the free radicals formed by means of an antioxidant, to date it was not known what antioxidants, if any, would be compatible with an acid medium and the synthesis solvents and would not affect the optical properties of the polymer, where it is desirable to have a maximum absence of coloration, a high light transmission and a high quality of transmission, i.e., the absence of any significant light diffusion.

Another problem encountered during the thermal tests is that of a drastic decrease in the viscosity of the material. Thus, after about 20 hours at 100° C. the flow of the material is already significant, and after about 100 hours the viscosity is so reduced as to be completely incompatible with a vertical position of the glazings, which can admittedly be accepted, e.g., for car sunroofs, but not for building glazings. Thus, during the assembly of the electrochromic system by a procedure similar to that currently used for the preparation of laminated glazings, the polymer is heated and an excessive flow is a handicap. It has also been found that this high temperature flow phenomenon even occurs in the absence of a hot drying treatment of the polymer, although such hot drying treatments tend to accentuate the problem.

Thus, there remains a need for protonic, conductive electrolytic materials which exhibit a reduced tendency to undergo yellowing. There also remains a need for protonic, conductive electrolytic materials which maintain a high viscosity even at high temperatures.

SUMMARY OF THE INVENTION

Accordingly, it is one object of the present invention to provide novel protonic, conductive electrolytic materials which exhibit a reduced tendency to undergo yellowing.

It is another object of the present invention to provide novel protonic, conductive electrolytic materials which maintain a high viscosity even at high temperatures.

These and other objects, which will become apparent during the following detailed description, have been achieved by the inventors' discovery that one should avoid the use of major families of antioxidants including phenolic derivatives (for which is has been found that at the concentrations needed to obtain the desired effect, there is both a slight yellowing of the polymer and the appearance of a milky effect making the glazing translucent), metallic derivatives (rejected due to their coloration), and amino derivatives (for which it has been found that there exists a precipitation phenomenon in the acid medium with also a milky effect formation). Most antioxidants of the family of phosphites and phosphines have also proven unsatisfactory, due to the appearance of a milky effect at the necessary concentrations for obtaining the sought action. However, triphenylphosphine, an anti-yellowing additive mainly used during the extrusion of plastics materials, has proved satisfactory, no precipitate or milky effect occurring, even at high concentrations, e.g., approximately 1.5% (based on the weight of the additive-free polymer).

The inventors have also found that by adding to a protonic, conductive polymer of the solid complex type of anhydrous phosphoric acid in polyoxyethylene, a thixotropic agent such as fumed silica (i.e., silica obtained by pyrogenic reaction), in a proportion generally between 3 and 20%, based on the weight of the orthophosphoric acid-polyoxyethylene complex and excluding other additives, said percentages being given for a polyoxyethylene with a molecular weigh of approximately 5,000,000, it is possible to obtain a material which maintains a high viscosity even at high temperatures.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Therefore, in a first embodiment, the present invention provides protonic, conductive, electrolytic, macromolecular materials of the solid complex type of an anhydrous orthophosphoric acid and polyoxyethylene comprising an antioxidant additive of the triphenylphosphine (TPP) type. This antioxidant additive is e.g., added in a proportion between 0.5 and 3 wt. % and preferably between 1 and 1.25 wt. %, based on the weight of the polymer $H_3PO_4$-POE complex, for a POE polymer, whose number average molecular weight is approximately 5,000,000. It is possible to use within the scope of the invention a POE having a different molecular weight and in particular a higher molecular weight. It is therefore possible to choose a POE with a number average molecular weight of 6,000,000, and 7,000,000 or 8,000,000.

The triphenylphosphine type antioxidant may be triphenylphosphine itself or it may be tritolylphosphine or trixylylphosphine. Triphenylphosphine is preferred.

The present protonic, conductive, electrolytic macromolecular complex comprising a solid complex of $H_3PO_4$ and polyoxyethylene and an antioxidant may be prepared by dissolving anhydrous $H_3PO_4$ in crystalline form in an appropriate solvent, e.g., THF and adding the solution to the POE followed by addition of acetonitrile to form the complex. A film of the resulting solution is formed and and dried to give a film of the complex. Since triphenylphosphine is itself soluble in THF it may be added in at the same time as the $H_3PO_4$.

The phosphoric acid is preferably added in a concentration of 0.5 molecule per ethylene oxide monomer unite, i.e., with a ratio (O:H) of the number of oxygen atoms of the polymer to the number of hydrogen atoms of the acid between about 0.2 and 1 and preferably equal to 0.66. For such an O:H ratio, the proton conductivity and optical transparency are advantageously maximal (see U.S. Pat. No. 4,844,591, which is incorporated herein by reference).

Preferably, the weight ratio of $H_3PO_4$ to POE is 0.9:1 to 1.1:1, more preferably about 1:1.

It should be noted that triphenyl phosphine not only has a favorable effect on the thermal tests, but also on the ultraviolet ageing tests by delaying the action of the peroxides formed under the action of the radiation, although the formation thereof is not completely prevented.

In a second embodiment, the present invention provides a macromolecular material having protonic conduction, whose viscosity at a temperature of about 100° remains compatible with a vertical positioning of the system in which the material is incorporated as an electrolyte, by incorporating fumed silica in the material. Fumed (or pyrogenic reacted) silica known as a thickening agent particularly for adhesives, pharmaceutical or cosmetic ointments, permits a very significant reduction in the flow, thus permitting installation in the vertical position without any problem.

Chemically unmodified, hydrophilic "fumed" (pyrogenic reacted) silicas on the surface of which are located siloxane groups and, in a smaller quantity, silanol groups, are satisfactory provided that they are used in relatively large quantities of about 12 wt. % or higher, particularly between 8 and 16 wt. %, based on the weight of the $H_3PO4$-POE solid complex. Moreover, the polymer remains fragile and in particular relatively sensitive to tearing, which is unexpected because hydrophilic fumed silicas are recommended for reinforcing elastomer materials.

This is not the case with hydrophobic fumed (pyrogenic reacted) silicas, obtained by a chemical modification of their surface by means of silanes so as to replace the silanol groups with silane groups. With such hydrophobic silicas, the sought increase in the viscosity is obtained for proportions generally between 4 and 10 wt. %, based on the weight of the $H_3PO_4$-POE solid complex, i.e., approximately one half that required in the case of hydrophilic fumed silicas. Very good results were obtained with a hydrophobic fumed (pyrogenic reacted) silica added at a rate of 6 to 8% by weight, based on the weight of the $H_3PO4$-POE solid complex. As in the case of the antioxidant additive, these proportions are given relative to the weight of the additive-free $H_3PO4$-POE polymer for a POE with a molecular weight of approximately 5,000,000.

Surprisingly, such hydrophobic fumed (pyrogenic reacted) silicas lead to a macro-molecular material which does not stick, is only slightly sensitive to tearing and which is self-supported at ambient temperature. Thus, the material can be prepared before hand, stocked in sheet form and cut to the desired dimensions, with a view to the assembly of the electrochromic system, thus obtaining operating conditions close to those used for laminated glazings, such as windscreens. Fumed or pyrogenic silicas (both hydrophilic and hydrophobic) are described in Iler, *The Chemistry of Silica*, Wiley-Interscience, NY 1979, which is incorporated herein by reference. Specific examples of the fumed Silica include Acticel, Aerosil, Amorphous Silica Dust, Aquafil, Cab-O-Grip II, Cab-O-Sil, Cab-O-Sperse, Cataloid, Colloidal Silica, Colloidal Silicon Dioxide, Davison SG-67, Dicalite, Dri-Die Insecticide 67, ENT 25,550, Fossil Flour, Fumed Silica, Fumed Silicon Dioxide, Ludox, Nalcoag, Nyacol, Nyacol 830, Nyacol 1430, Santocel, SG-67, Silca, Amorphous, Silicic anhydride, Silikill, and Vulkasil. The average particle size of the fumed silica is suitably 3 to 20 mm, preferably 5 to 15 mm.

However, hydrophobic thixotropic agents suffer from one deficiency, namely that of "crazing" on their edges and which is probably due to their hardness. However, advantageously this phenomenon disappears for the preferred polymers according to the invention, which have undergone heating for degassing.

It has also very advantageously been found that an anti-oxidant of the triphenyl phosphine type gives the polymer properties facilitating its drying and in particular its degassing, which can be carried out at a lower temperature. As will be shown hereinafter, this leads to completely unexpected results with respect to the optical performance characteristics. Moreover, this treatment at a lower temperature is less likely to deteriorate other layers of the system and in particular those beneath the polymer, when the latter is directly deposited in situ.

Advantageously in the simultaneous presence of a hydrophobic fumed (pyrogenic reacted) silica and triphenyl phosphine, the temperature during the hot heating treatment can be reduced by 10°/20° C., for an identical treatment time and without limiting the anti-bubbling effect on the anti-crazing effect. The optimum hot treatment temperature is then approximately 100° C., which is favorable both for the aging of the polymer and for that of the other system layers. It also becomes possible to perform this treatment on the single film, which is self-supportable.

The present invention also relates to a process for treatment by drying of the previously defined macromolecular material. This drying can be carried out at a temperature between 90° and 120° C., preferably 100° to 110° C., for approximately 1 to 3 hours.

Other features of the invention will become apparent in the course of the following descriptions of exemplary embodiments which are given for illustration of the invention and are not intended to be limiting thereof.

EXAMPLES

Preparation of the Standard Polymer:

25 g of anhydrous orthophosphoric acid ($H_3PO_4$) in crystalline form (reference 04102 of SOTRACHEM FRANCE), having a molecular weight of 98, is dissolved with stirring in 400 ml of tetrahydrofuran (THF) (reference 28551296 of PROLABO FRANCE). 23 g of polyoxyethylene (POE) (reference 18947.2 of ALDRICH), whose molecular weight, given in the catalogue, is 5,000,000 is added. This is followed by the addition of 600 ml of acetonitrile (ACN) (reference 20060296 from PROLABO FRANCE). The $H_3PO_4$-POE complex forms and the mixture becomes viscous. The polymer in solution in the mixture of solvents ACN/THF is homogenized accompanied by stirring for 24 hours for 1 liter of preparation and 3 or 4 hours for 4 liters of preparation.

The polymer solution is then placed in a container, whose bottom has a calibrated slit of 1.1 mm, located 5 cm from the support to be covered. With the slit open, the polymer flows out to form a curtain of homogenous thickness. The speed of the support is regulated in such a way that the angle formed between the curtain and the vertical is at the most 30° so that the film undergoes no stress by stretching.

The film is then dried under a flow of dry air, at ambient temperature and for 8 hours. Its thickness is then 80 microns. It then undergoes prolonged drying for 72 hours at ambient temperature (reference) or 3 hours in the oven at a temperature of 100° C. (test No. 1) or 120° C. (test No. 2), under a pressure of 0.05 millibars. It is also possible to carry out this degassing phase in two stages, a first hot stage, under atmospheric pressure and a second stage in vacuo and at ambient temperature.

The assembly to form a laminate takes place at 120° C., under a pressure of 6 bars and for 60 minutes.

Anti-oxidant Additives:

Triphenyl phosphine (available under reference 60404 from RIEDEL de HAEN), which is a solid product at ambient temperature and soluble in THF, is consequently added to the preparation at the same stage as the orthophosphoric acid.

Thixotropic Agents:

The tests were performed on the basis of fumed (pyrogenic reacted) silicas marketed under the registered trademarks AEROSIL of DEGUSSA, GERMANY. The silica content of these silicas exceeds 99.8% (based on the substance calcined for 2 hours at 1000° C.), the other residual constituents being essentially alumina (<0.05%), ferric oxide (<0.003% for the two hydrophilic variants and 0.01% for the hydrophobic variant) and titanium dioxide (<0.03%).

The two tested hydrophilic variants are marketed under the references AEROSIL 200 (TX1) and AEROSIL 380 (TX2), the former having particles with an average size 12 nanometers (BET surface according to DIN standard 66131 200± 25) and the second approximately 7 nanometers (BET surface 380± 30).

The hydrophobic variant is available under the reference AEROSIL R 974 (TX3). The average particle size is 12 nanometers (BET surface 170±20).

In all cases, the thixotropic agent is added to the polymer as a THF suspension in order to avoid the formation of lumps. The percentages are calculated with respect to the weight of the $H_3PO_4$-POE complex.

It should be noted that the polymer with a hydrophobic thixotropic agent as the additive is advantageously less sticky and more resistant.

Flow Tests:

The polymer is poured on a 100×100 mm$^2$ glass, covered with transparent adhesive paper except for a central disk of 50 mm. On removing the adhesive after drying, an 80 μm thick polymer disk having a diameter of 50 mm is obtained. Assembly takes place with another 100×100 mm$^2$ glass and butyl at the edges of the glasses. After autoclaving, the diameter increase giving the flow (in %) is measured. The Aerosil charge is expressed as a weight percentage based on the POE+ $H_3PO_4$ weight. It should be noted that when this percentage is below 6%, the mechanical effect of the Aerosil is substantially invisible, except with regards to the hydrophobic additive TX3.

The test results are summarized in the following table.

|  |  | FLOW AT 120° | FLOW AT 130° C. |
|---|---|---|---|
| Reference |  | 36% | 47% |
| Test No. 1 |  | 70% | 80% |
| Test No. 2 + TX1 | (%) |  |  |
|  | 6% | 70% | 80% |
|  | 8% | 40% | 35% |
|  | 10% | 31% | 37% |
| Test No. 2 + TX2 | (%) |  |  |
|  | 6% | 70% | 80% |
|  | 8% | 28% | 35% |
|  | 10% | 18% | 25% |
| Test No. 3 + TX3 | (%) |  |  |
|  | 6% | 40% | 58% |
|  | 8% | 10% | 32% |
|  | 10% | 5% | 12% |

As indicated hereinbefore, the degassing treatment at 120° C. (test no. 2) has a very negative effect on the mechanical strength of the polymer. However, the three tested additives make it possible to again obtain the mechanical strength of the reference polymer and even improve it very significantly, particularly with the hydrophobic additive TX3. In practice, in order to avoid any deterioration of the product, it is desirable for the flow at 120° C. to be below 10%. This aim is achieved with additive TX3 for an additive percentage of approximately 8%, whereas this percentage must be raised to approximately 14% for the additive TX2 and approximately 18% in the case of the additive TX1, which gave the least satisfactory results, at least if for financial reasons it is wished to adopt reduced additive contents.

Aspects of the Polymer:

As will be shown hereinafter when comparing the evolution of the different optical properties during thermal cycles, the addition of fumed (pyrogenic reacted) silica essentially has no effect thereon compared with the solid complex $H_3PO_4$-POE alone. However, with the hydrophobic thixotropic agent, the stresses imposed by the thermal tests give rise to crazing on the edges of the glazing after only about 20 hours. Advantageously this phenomenon no longer appears with polymers also incorporating TPP as the antioxidant and which also appears to act as a slightly fluidifying agent without significantly affecting the viscosity of the polymer. Thermal tests on a large glazing (height 80 cm/width 60 cm) installed in the vertical position with a polymer having 8% of agent R 974 and 1% TPP revealed no flow after 600 hours at 100° C. and only 1 mm flow after 300 hours, when the hydrophobic thixotropic agent proportion is reduced to 6%.

Haze:

Haze is conventionally defined as being equal to the diffused light proportion compared with incident light. Beyond 1% it starts to become prejudicial, the eye then perceiving a slight deformation of images.

Figure 1:
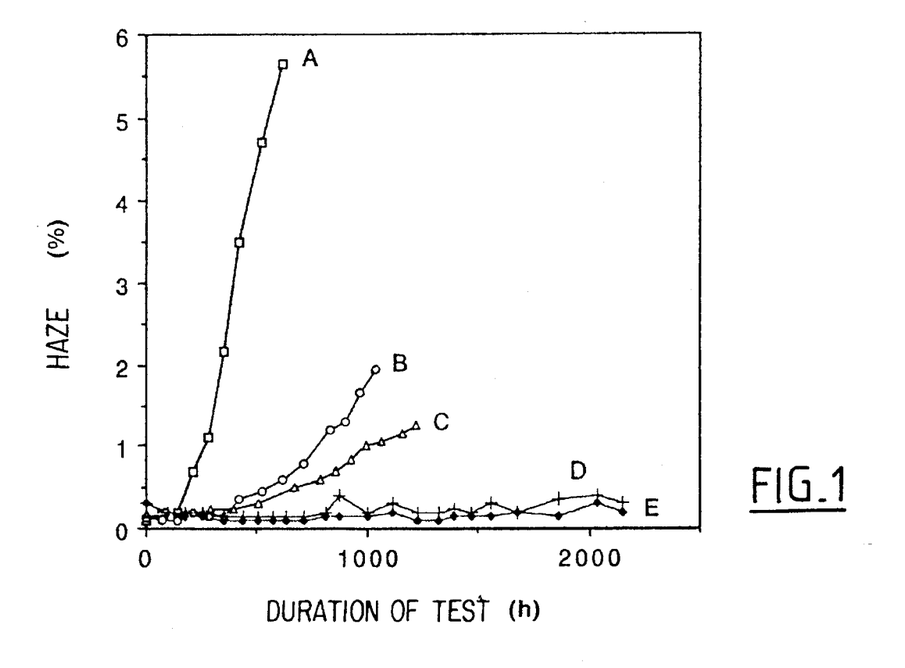
FIGS. 1 to 3 are graphs showing the evolution of blur during a thermal test at 100°, 110° or 120° C. (haze in % on the ordinate, duration in hours on the abscissa)
Figure 2:
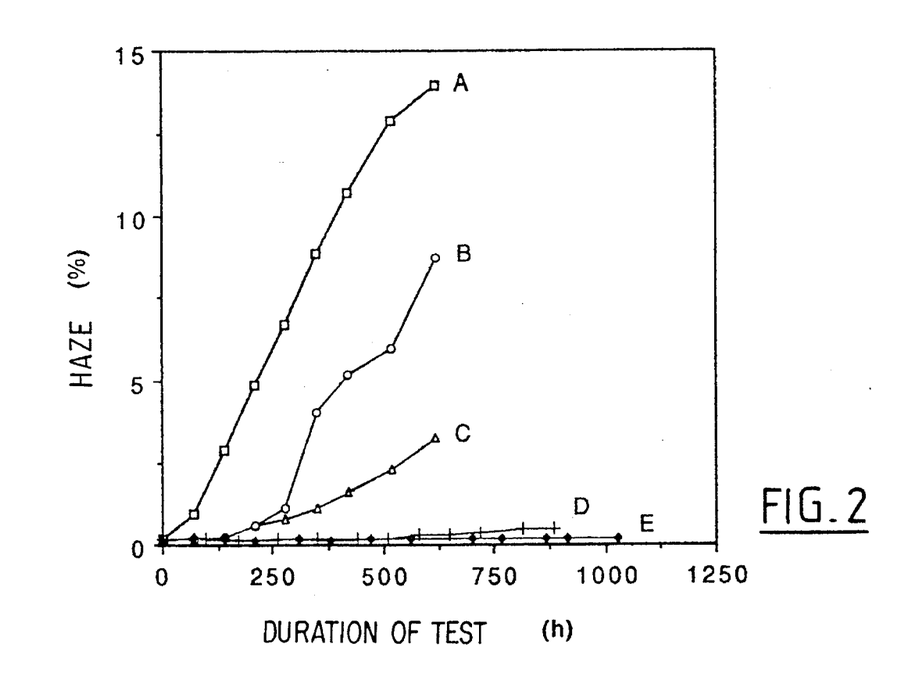
Figure 3:
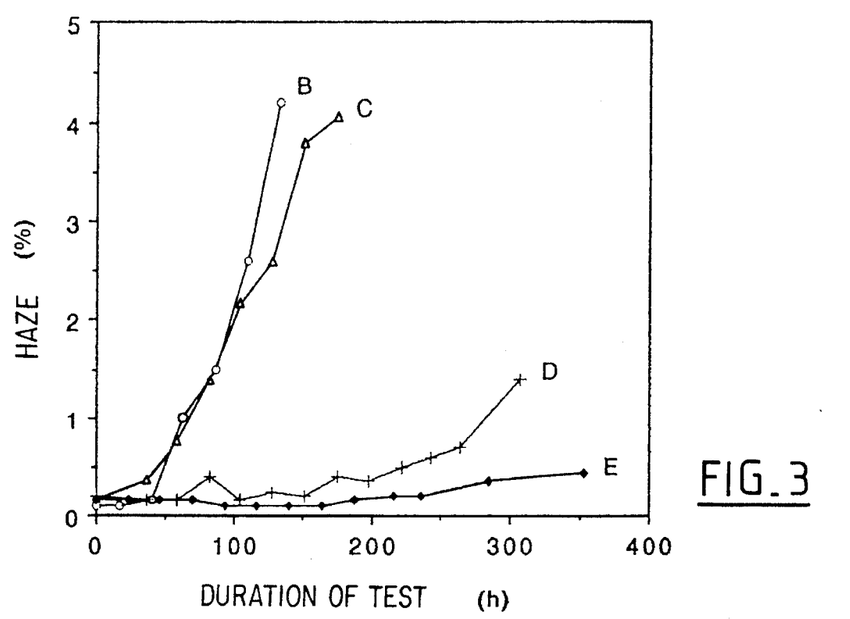

FIGS. 1 to 3 show the evolution of the haze of a glazing constituted by two glass plates assembled by a polymer of the following type:

A: Standard polymer dried at 20° C. for 72 hours (reference)
A': Standard polymer heated to 100° C. for 3 hours (test no. 1)
B: Standard polymer heated to 120° C. for 3 hours (test no. 2)
C: B+8% hydrophobic thixotropic agent R 974 (test no. 2 + 8% TX3)
D: C+1% TTP (test no. 2+ 8% TX3+ 1% TPP)
E: A'+ 8% hydrophobic thixotropic agent R 974+1% TPP (test no. 1+ 8% TX3+ 1% TPP)

the above being a function of the test at 100° C. (FIG. 1), 110° C., (FIG. 2) and 120° C. (FIG. 3).

At the scale used, curves A and A' coincide. In order to be effective, the heating must be performed at a minimum of 110° C. Curve B demonstrates this effectiveness, but with still haze of more than 1% after approximately 800 hours.

Comparison of the different curves of FIG. 1 clearly shows an advantage for the polymers D and E for which the haze remains below 0.5% after 1800 hours at 100° C. This result is confirmed by the test at 110° C. At 120° C., (FIG. 3) it can also be seen that the polymer E (for which the drying was performed at 100° C. only, deteriorates less rapidly than the polymer dried at 120° C., whereas in the absence of any additive, the polymer derived at 120° C. is better than that dried at 100°.

The following photometric data are used based on the illuminant $D_{65}$.

Figure 4:
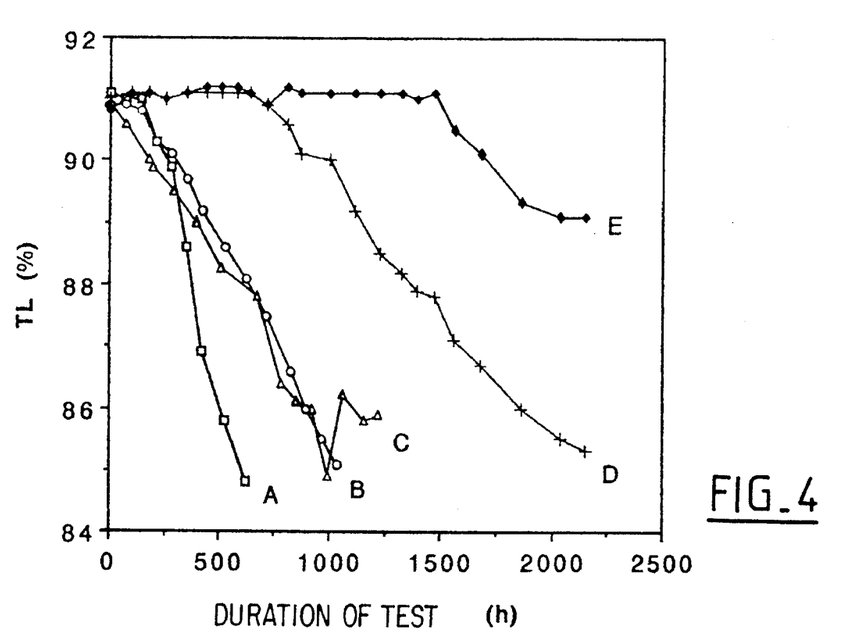
FIGS. 4 to 6 are graphs showing the evolution of the light transmission, T, during a thermal test at 100° C., 110° C. or 120° C. ($T_L$ in % on the ordinate, duration in hours on the abscissa)
Figure 5:
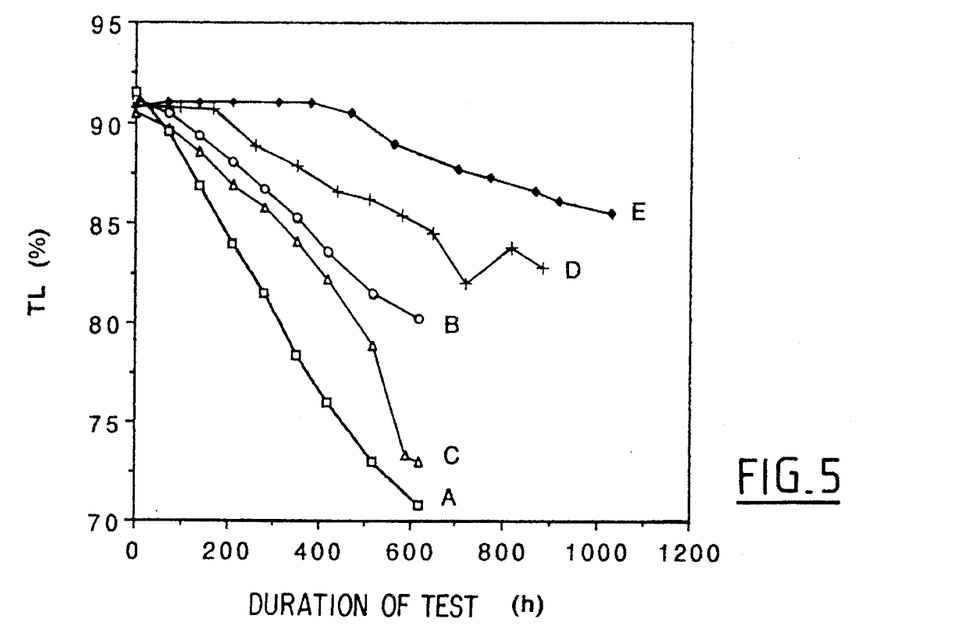
Figure 6:
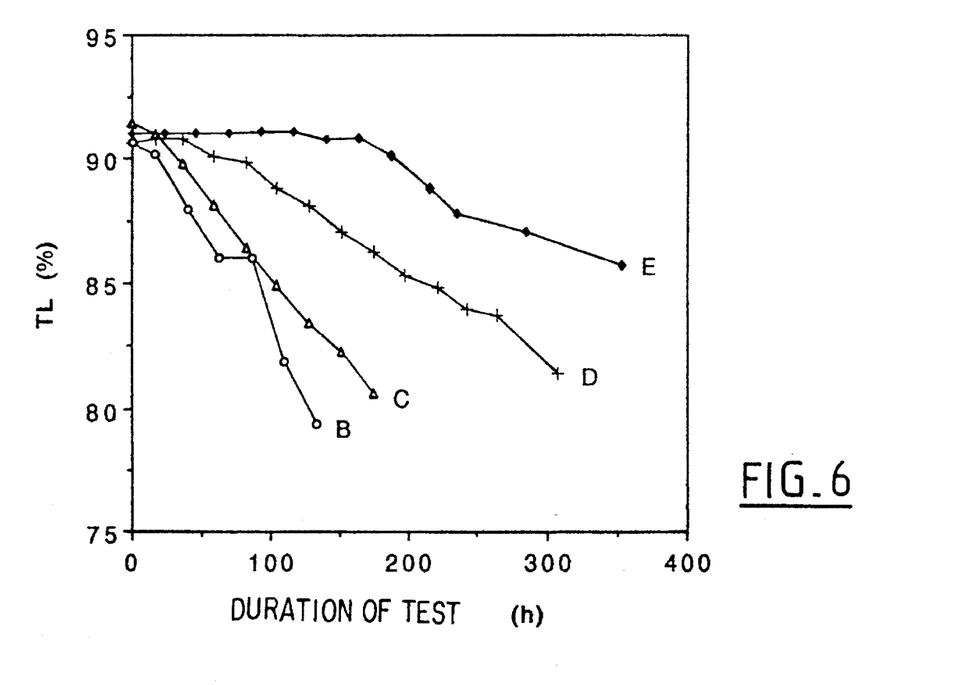

Light Transmission (FIGS. 4 to 6):

The classification of the polymers A to E is substantially the same as in the preceding case, except that the polymer C has a behavior virtually identical to polymer B. It should also be noted that the deterioration of the light transmission is delayed by more than 500 hours for the polymer E (attenuation after ±1500 hours, to be compared with ±600 hours for polymer D, 200 hours for polymers C and B and as from the start of the test for polymer A). As hereinbefore, the tests at 110° and 120° C. confirm this classification, polymer D being the only polymer not to demonstrate the deterioration of the light transmission as from the start of the test at 120° C. In fact, the curve has a plateau during approximately the first 150 hours.

Figure 7:
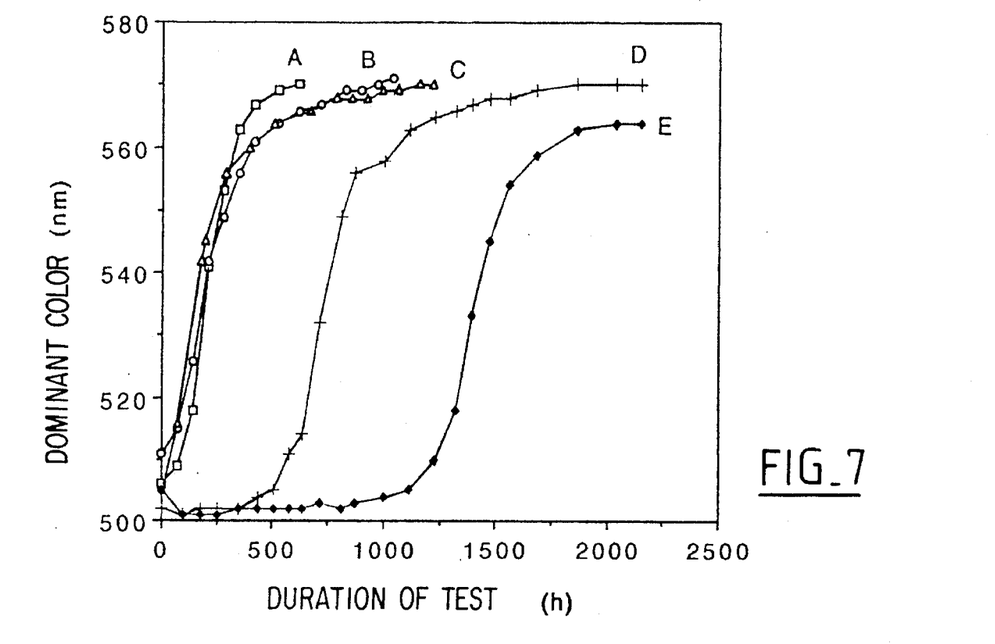
FIGS. 7 to 9 are graphs showing the evolution of the dominant color during a thermal test at 100° C., 110° or 120° C. (dominant wavelength in transmission in nm on the ordinate, duration in hours on the abscissa)
Figure 8:
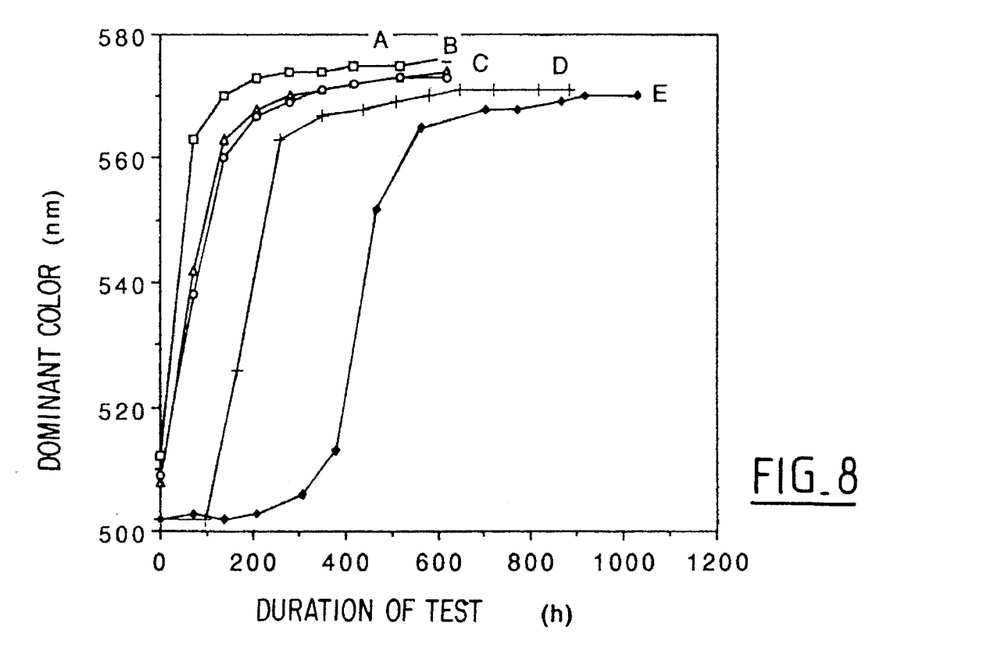
Figure 9:
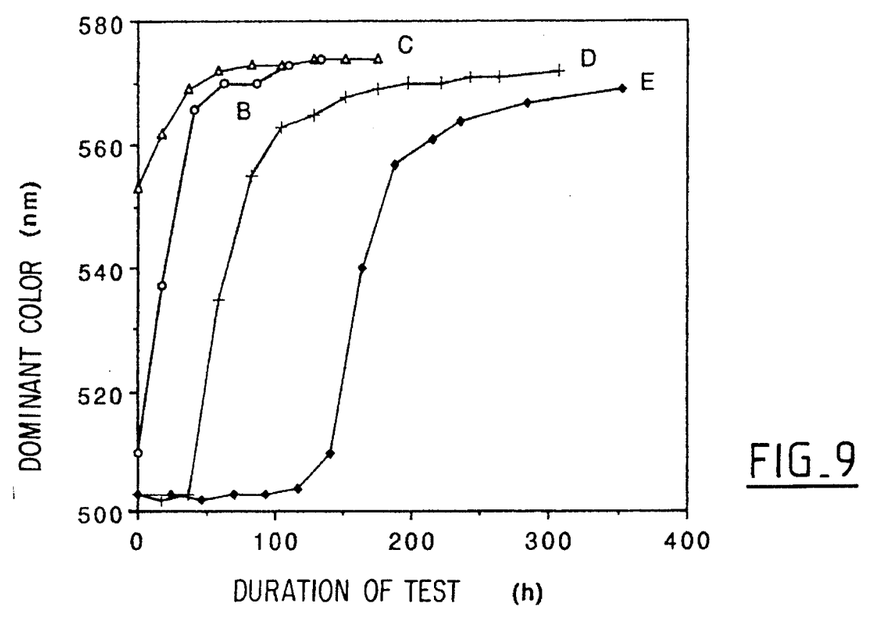

Evolution of the Color (FIGS. 7 to 9) and the Purity (FIGS. 10 to 12):

FIGS. 7 to 9 show the evolution of the dominant color (dominant wavelength in transmission) as a function of the duration of the test, it being pointed out that the wavelength of 500 to 530 nanometers corresponds to green tints and 550 to 570 nanometers to yellow/orange tints, generally much less valued for glazings. For polymers A, B and C, yellowing appears after approximately 250 hours. The duration of the test is doubled for a polymer D and is further extended by approximately 540% for polymer E.

Figure 10:
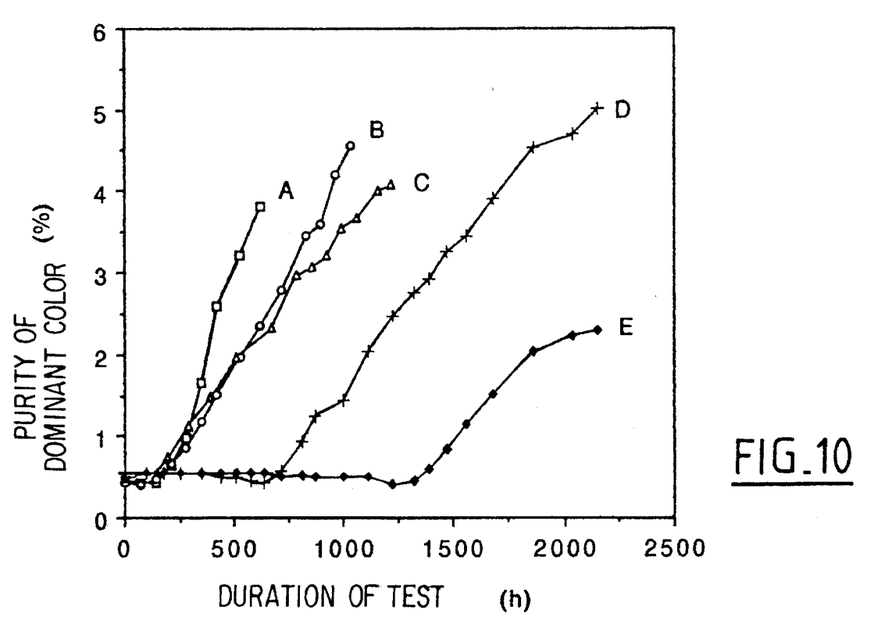
FIGS. 10 to 12 are graphs showing the evolution of the purity in the dominant color during a thermal test at 100° C., 110° or 120° C. (purity in % on the ordinate, duration in hours on the abscissa).
Figure 11:
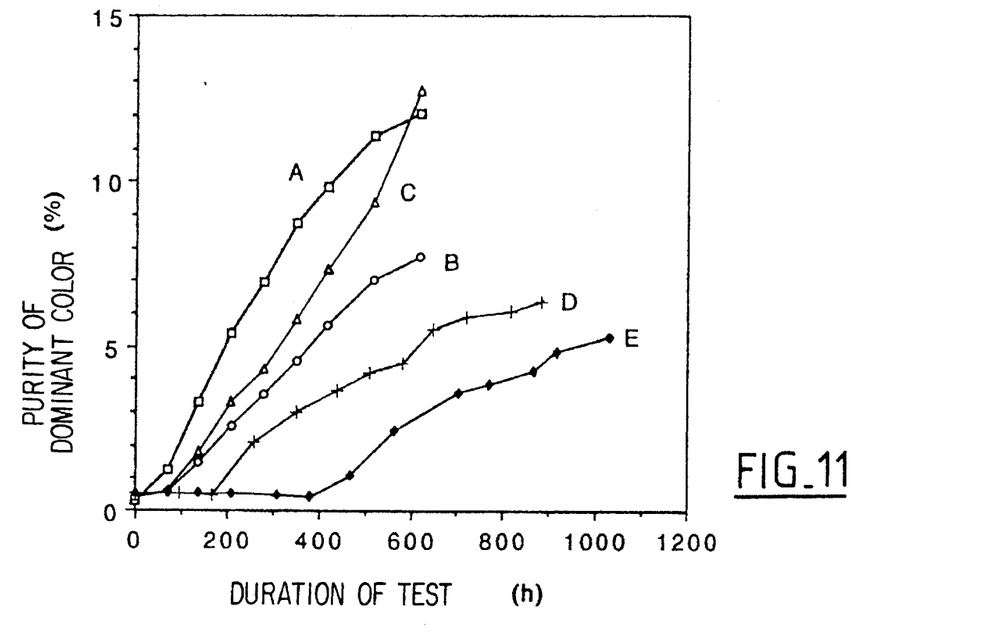
Figure 12:
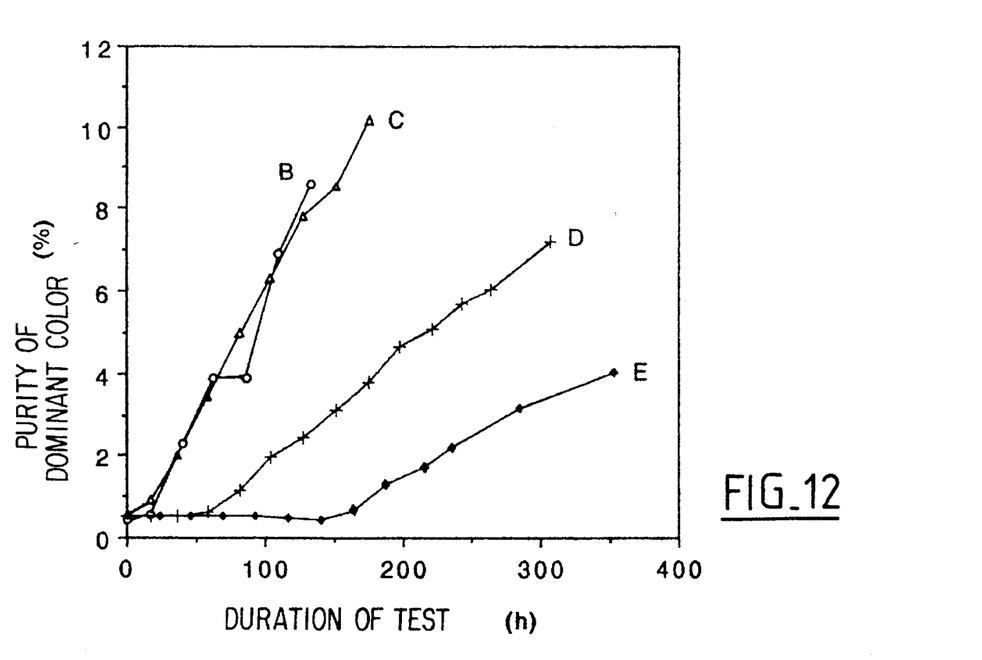

The curves of FIGS. 10 to 12 show the evolution of the purity in the dominant color precisely follows the same tendencies. Thus, not only do the polymers according to the invention have a clearly reduced yellowing tendency, but also the purity in the dominant color (or in other words the perception of the dominant color by the eye, is much lower than with polymers D and E.

This application is based on French Patent Application FR-94/02048, filed on Feb. 23, 1994, which is incorporated herein by reference in its entirety.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A protonic, conductive, macromolecular material, comprising: (a) a solid complex of anhydrous orthophosphoric acid and polyoxyethylene, and (b) an antioxidant.

2. The macromolecular material of claim 1, wherein said antioxidant is triphenyl phosphine, tritolyl phosphine or trixylyl phosphine.

3. The macromolecular material of claim 1, wherein said antioxidant is present in an amount between 0.5 to 3 wt. %, based on the weight of said solid complex of orthophosphoric acid and polyoxyethylene.

4. The macromolecular complex of claim 1, wherein said antioxidant is present in an amount between 1 and 1.25 wt. %, based on the weight of said solid complex of orthophosphoric acid and polyoxyethylene.

5. A protonic, conductive, macromolecular material, comprising: (a) a solid complex of anhydrous orthophosphoric acid and polyoxyethylene, and (b) 3 to 20 wt. %, based on the weight of said solid complex of anhydrous orthophosphoric acid and polyoxyethylene, of a thixotropic agent.

6. The macromolecular material of claim 5, wherein said thixotropic agent is a hydrophilic fumed pyrogenic reacted silica.

7. The macromolecular material of claim 6, wherein said thixotropic agent is present in an amount between 8 and 16 wt. %, based on the weight of said solid complex of anhydrous orthophosphoric acid and polyoxyethylene.

8. The macromolecular material of claim 5, wherein said thixotropic agent is a hydrophobic, fumed pyrogenic reacted silica, modified by silanes.

9. The macromolecular material of claim 8, wherein said thixotropic agent is present in an amount between 4 and 10 wt. %, based on the weight of said solid complex of anhydrous orthophosphoric acid and polyoxyethylene.

10. The macromolecular material of claim 8, wherein said thixotropic agent is present in an amount between 6 and 8 wt. %, based on the weight of said solid complex of anhydrous orthophosphoric acid and polyoxyethylene.

11. The macromolecular material of claim 9, characterized in that it is in the form of self-supported sheets.

12. A protonic, conductive, macromolecular material, comprising: (a) a solid complex of anhydrous orthophosphoric acid and polyoxyethylene; (b) an antioxidant; and (c) 3 to 20 wt. %, based on the weight of said solid complex of anhydrous orthophosphoric acid and polyoxyethylene, of a thixotropic agent.

13. The macromolecular material of claim 12, wherein said antioxidant is triphenyl phosphine, tritolyl phosphine or trixylyl phosphine.

14. The macromolecular material of claim 12, wherein said antioxidant is present in an amount between 0.5 to 3 wt. %, based on the weight of said solid complex of orthophosphoric acid and polyoxyethylene.

15. The macromolecular complex of claim 12, wherein said antioxidant is present in an amount between 1 and 1.25 wt. %, based on the weight of said solid complex of orthophosphoric acid and polyoxyethylene.

16. The macromolecular material of claim 12, wherein said thixotropic agent is a hydrophilic fumed pyrogenic reacted silica.

17. The macromolecular material of claim 12, wherein said thixotropic agent is hydrophilic and is present in an amount between 8 and 16 wt. %, based on the weight of said solid complex of anhydrous orthophosphoric acid and polyoxyethylene.

18. The macromolecular material of claim 12, wherein said thixotropic agent is a hydrophobic, fumed pyrogenic reacted silica, modified by silanes.

19. The macromolecular material of claim 12, wherein said thixotropic agent is hydrophobic and is present in an amount between 4 and 10 wt. %, based on the weight of said solid complex of anhydrous orthophosphoric acid and polyoxyethylene.

20. The macromolecular material of claim 12, wherein said thixotropic agent is hydrophobic and is present in an amount between 6 and 8 wt. %, based on the weight of said solid complex of anhydrous orthophosphoric acid and polyoxyethylene.

21. A macromolecular material, comprising: (a) a solid complex of orthophosphoric acid and polyoxyethylene, (b) 8 wt. %, based on the weight of said solid complex of orthophosphoric acid and polyoxyethylene, of hydrophobic, fumed pyrogenic reacted silica, and (c) about 1 wt. %, based on the weight of said solid complex of orthophosphoric acid and polyoxyethylene, of triphenyl phosphine.

22. A process for the treatment of a protonic, conductive, macromolecular material, said material comprising: (a) a solid complex of anhydrous orthophosphoric acid and polyoxyethylene; and (b) an antioxidant, said process comprising drying said macromolecular material at a temperature between 90° and 120° C. for 1 to 3 hours.

23. The process of claim 22, wherein said drying is carried out at a temperature between 100° and 110° C.

24. A process for the treatment of a protonic, conductive, macromolecular material, said material comprising: (a) a solid complex of anhydrous orthophosphoric acid and polyoxyethylene; and (b) 3 to 20 wt. %, based on the weight of said solid complex of orthophosphoric acid and polyoxyethylene, of a thixotropic agent, said process comprising drying said macromolecular material at a temperature between 90° and 120° C. for 1 to 3 hours.

25. The process of claim 24, wherein said drying is carried out at a temperature between 100° and 110° C.

26. An electrochromic system, comprising an oxide of a transition metal in contact with a solid electrolyte, wherein said solid electrolyte is a protonic, conductive, macromolecular material, comprising: (a) a solid complex of anhydrous orthophosphoric acid and polyoxyethylene, and (b) an antioxidant.

27. The electrochromic system of claim 26, installed in a vertical position.

28. An electrochromic system, comprising an oxide of a transition metal in contact with a solid electrolyte, wherein said solid electrolyte is a protonic, conductive, macromolecular material, comprising: (a) a solid complex of anhydrous orthophosphoric acid and polyoxyethylene, and (b) 3 to 20 wt. %, based on the weight of said solid complex of anhydrous orthophosphoric acid and polyoxyethylene, of a thixotropic agent.

29. The electrochromic system of claim 28, installed in a vertical position.

* * * * *